Sept. 13, 1927.  J. F. GAYLORD  1,642,107
CLUTCH
Filed Dec. 3, 1924
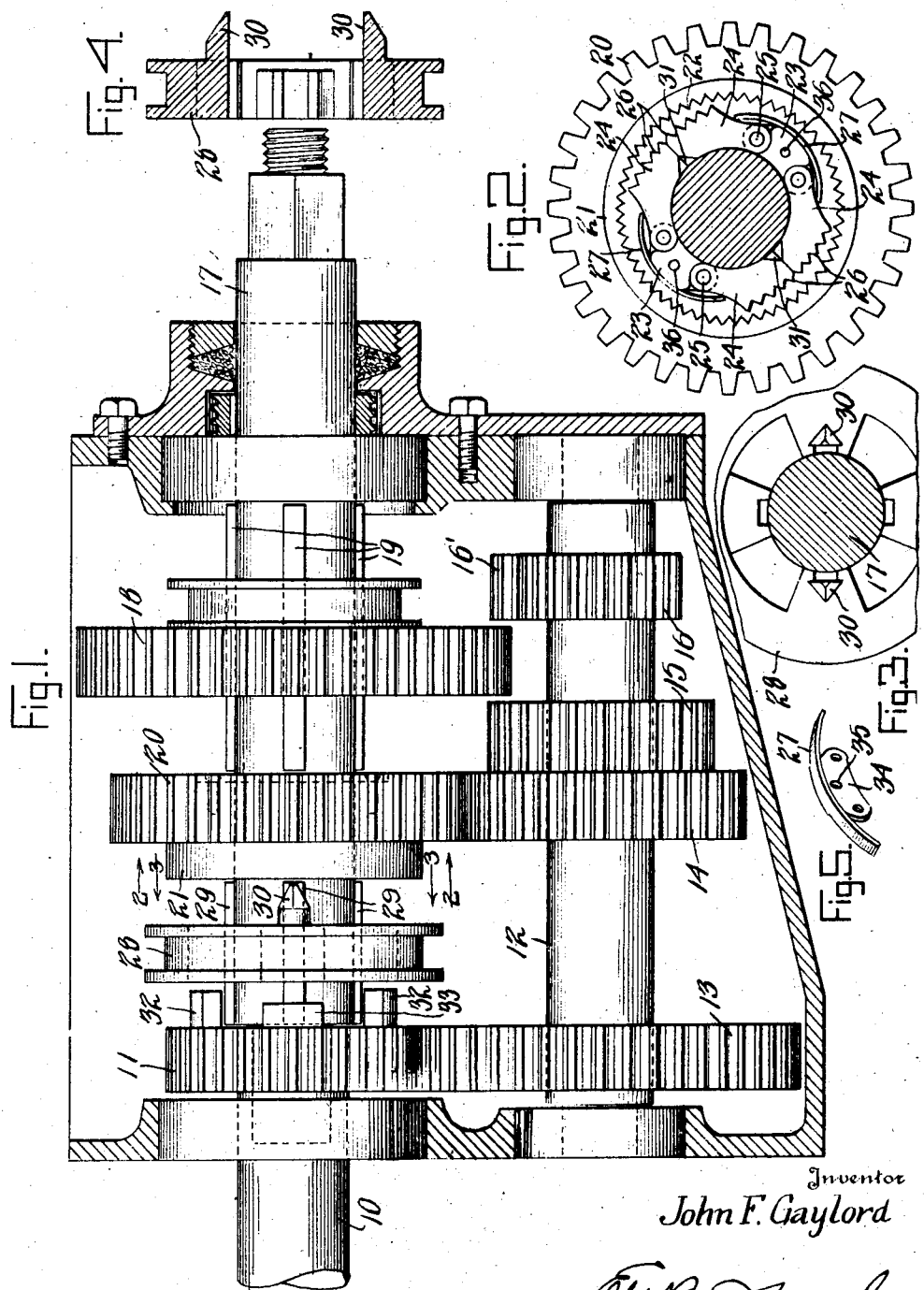
Inventor
John F. Gaylord Patented Sept. 13, 1927.

1,642,107

UNITED STATES PATENT OFFICE.

JOHN F. GAYLORD, OF INDIANAPOLIS, INDIANA.

CLUTCH.

Application filed December 3, 1924. Serial No. 753,701.

My said invention relates to a clutch adapted for use with a variable speed transmission mechanism and it is an object of the same to provide a device of this character which shall be simple and durable and inexpensive to manufacture.

A further object of the invention is to provide a clutch in which the parts may be shifted without injury regardless of the relative speeds of the driving and driven devices.

Referring to the accompanying drawings, which are made a part hereof and on which similar reference characters indicate similar parts, Figure 1 is a side elevation of my device, Figure 2, a face view of a clutch element looking in the direction of the arrows 2—2 of Figure 1, Figure 3, a face view of another clutch element looking in the direction of the arrows 3—3 in Figure 1, Figure 4, a section of a clutch member shown in Figure 1, and Figure 5, a detail of a spring device.

In the drawings reference character 10 indicates an engine shaft or other power shaft of the device, said shaft having fixed thereto a gear 11 by means of which a counter shaft 12 is driven constantly, said countershaft having a series of pinions 13, 14, 15 and 16 secured thereto, the first-named pinion meshing with gear 11 and the last-named pinion meshing with an idler 16'.

The driven shaft 17, which is alined with the driving shaft by means of a reduced end on one shaft projecting into a socket in the other as shown in dotted lines in Figure 1, is provided with a gear 18 movable by any desirable or conventional mechanism into driving relation with the low speed pinion 15 or the idler pinion 16', the latter providing for reverse speed of the transmission shaft 17. The gear 18 is splined to the driven shaft 11 by splines 19.

A gear 20 is loosely mounted on the driven shaft this gear meshing with the pinion 14 on the countershaft. The gear 20 has an extension 21 at one side which is hollow and is provided with a series of internal teeth 22 extending completely about the interior periphery of the extension. Within the hollow interior the driven shaft is provided with lateral lugs 23. Each of said lateral lugs has a pair of dogs 24 pivoted adjacent thereto at 25 and these dogs are provided on their outer faces with teeth 26 adapted to engage the internal teeth 22. A spring 27 is provided for each pair of dogs, the spring tending to throw the dogs out of engagement with the teeth 22.

A clutch member 28 is splined to the driven shaft by splines indicated at 29 and said member carries at opposite sides tapered lugs 30 triangular in section, each of which is adapted to engage between a pair of dogs at the point indicated at 31 in Figure 2 where the dogs have corresponding tapered openings whereby said lugs 30 force the dogs out into engagement with the teeth 22. The lugs are of uniform diameter for a part of their length adjacent to member 28 to prevent cam action such as would otherwise tend to force them out of engagement with the dogs 24. In this situation the drive is through the engine shaft 10, the fixed gear 11, the countershaft 12 and the pinions 13 and 14 fixed thereon, loose gear 20 and the clutch to the driven shaft 17.

The clutch member 28 has recesses providing faces between them, the alternate ones of which are flush with a face of the clutch member and the others are stepped back as fully explained in my copending application No. 752,972, of November 29, 1924 and the gear 11 has laterally projecting clutch dogs which are alternately long and short as shown at 32 and 33 in Figure 1 and which are adapted to coact with the recesses in the clutch member 28 so as to insure quick engagement of the parts without damage to each other. When these teeth are engaged with those of the clutch member a direct drive results from shaft 10 through the clutch to shaft 17 thereby providing for high speed of the device.

It will be understood that the countershaft and its pinions as well as any gears in mesh therewith will be in rotation at all times. When the low speed is desired gear 18 is shifted into mesh with pinion 15, the clutch member 28 being placed in neutral. Reverse speed is had by shifting gear 18 into mesh with idler 16'.

A desirable means for securing dogs 24 in place is shown in Figure 5 and this consists of a plate 34 with a hole 35 for a screw 36 to secure it to a lug 23, and with other holes at each side of the first for pivot pins at 25 for dogs 24. The spring 27 may be secured to the plate 34 in any preferred manner, as may also the pivot pins 25.

It should be noted as to the teeth at 22 that these coact with those on the dogs 24 to effect a cam action tending to throw the dogs out into effective engagement as soon as the teeth touch, instead of merely chattering over each other as in some hitherto known devices of this general character.

It will be obvious to those skilled in the art that many changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. In a device of the class described, a shaft, a gear loosely mounted on said shaft, having internal gear teeth, a clutch member on said shaft, means whereby the gear may be clutched to the shaft including pairs of oppositely directed levers pivotally supported in substantially the same transverse plane on the shaft and adapted to engage the gear, spring means for holding the levers out of engagement with the gear, means on said clutch member for operating said levers, said means comprising lateral projections with oppositely bevelled faces adapted to act on a pair of said levers for forcing them into engagement with the teeth on the gear, substantially as set forth.

2. The combination of a shaft, a gear loosely mounted on said shaft having an internal circumferentially extending series of teeth, levers mounted transversely on said shaft having their ends formed with teeth for engagement with said circumferential teeth and a clutch member for forcing the teeth of the levers into engagement with the circumferential teeth to clamp the gear on the shaft, said clutch member having inwardly extending projections supporting the clutch member on the shaft and laterally extending clutch dogs mounted on alternate projections, substantially as set forth.

3. The combination of a shaft, a gear loosely mounted on said shaft having an internal circumferentially extending series of teeth, levers mounted in pairs transversely on said shaft the levers of each pair having their ends normally lying in abutting relation and formed with teeth for engagement with said circumferential teeth and a clutch member for forcing the teeth of the levers into engagement with the circumferential teeth to clamp the gear on the shaft, said clutch member having inwardly extending projections and laterally extending clutch dogs mounted on alternate projections, and spring members for holding the levers out of engagement with the circumferential teeth, substantially as set forth.

4. The combination of a shaft, a gear loosely mounted on said shaft, a lateral circumferential extension on said gear having an internal circumferentially extending series of teeth, levers mounted in pairs transversely on said shaft the levers of each pair having their ends normally lying in abutting relation and formed with teeth for engagement with said circumferential teeth and a clutch member for forcing the teeth of the levers into engagement with the circumferential teeth to clamp the gear on the shaft, said clutch member having inwardly extending projections and laterally extending clutch dogs mounted on alternate projections, and spring members for holding the levers out of engagement with the circumferential teeth, substantially as set forth.

In witness whereof, I have hereunto set my hand at Washington, District of Columbia, this twenty-sixth day of November, A. D. nineteen hundred and twenty-four.

JOHN F. GAYLORD.